(12) United States Patent
Takahama

(10) Patent No.: US 7,221,178 B2
(45) Date of Patent: May 22, 2007

(54) WORKING SYSTEM FOR CIRCUIT BOARDS

(75) Inventor: Toru Takahama, Chiryu (JP)

(73) Assignee: Fuji Machine Mfg. Co., Ltd., Chiryu-shi (JP)

( * ) Notice: Subject to any disclaimer, the term of this patent is extended or adjusted under 35 U.S.C. 154(b) by 0 days.

(21) Appl. No.: 11/276,894

(22) Filed: Mar. 17, 2006

(65) Prior Publication Data

US 2006/0241888 A1 Oct. 26, 2006

(30) Foreign Application Priority Data

Apr. 11, 2005 (JP) .............................. 2005-139053

(51) Int. Cl.
*G01R 31/02* (2006.01)
(52) U.S. Cl. .................. 324/758; 356/399; 382/151
(58) Field of Classification Search ..................... None
See application file for complete search history.

(56) References Cited

U.S. PATENT DOCUMENTS

| | | | | |
|---|---|---|---|---|
| 4,818,933 A | * | 4/1989 | Kerschner et al. | 324/754 |
| 4,820,975 A | * | 4/1989 | Diggle | 324/758 |
| 5,321,352 A | * | 6/1994 | Takebuchi | 324/758 |
| 5,530,374 A | * | 6/1996 | Yamaguchi | 324/758 |
| 5,644,245 A | * | 7/1997 | Saitoh et al. | 324/754 |
| 5,777,485 A | * | 7/1998 | Tanaka et al. | 324/757 |
| 5,798,651 A | * | 8/1998 | Aruga et al. | 324/754 |
| 5,876,884 A | * | 3/1999 | Maeda et al. | 430/22 |
| 6,032,724 A | * | 3/2000 | Hatta | 165/80.2 |
| 6,084,419 A | * | 7/2000 | Sato et al. | 324/754 |
| 6,111,421 A | * | 8/2000 | Takahashi et al. | 324/758 |
| 6,124,725 A | * | 9/2000 | Sato | 324/765 |
| 6,189,674 B1 | | 2/2001 | Izumida et al. | |
| 6,897,956 B2 | * | 5/2005 | Noguchi et al. | 356/401 |
| 2003/0178988 A1 | * | 9/2003 | Kim | 324/158.1 |

FOREIGN PATENT DOCUMENTS

JP 11-163595 6/1999

* cited by examiner

*Primary Examiner*—Ha Tran Nguyen
*Assistant Examiner*—Richard Isla-Rodas
(74) *Attorney, Agent, or Firm*—Oblon, Spivak, McClelland, Maier & Neustadt, P.C.

(57) ABSTRACT

In a working system for circuit boards such as, typically, as an electronic component mounting apparatus, an image pickup camera mainly for detecting the position of a reference mark on a circuit board or/and for detecting the misalignment of an electronic component from the axis a mounting head holding the electronic component is also utilized for detecting a peculiar portion formed on one of board lifting plates for lifting a circuit board to be clamped at a working position on a circuit board transfer conveyer. The peculiar portion comprises a plurality of grooves formed on one board lifting plate made of stainless steel for being detected as a plurality of dark regions appearing on the stainless steel board lifting plate. When the circuit board is transferred to the working position on the circuit board transfer conveyer, one of the dark regions to be detected is hidden by the circuit board from the image pickup camera, so that the presence of the circuit board on the board transfer device can be judged. Further, the detection/non-detection of the peculiar portion by the image pickup camera can also be utilized to control or decelerate the transfer speed of the circuit board on the circuit board transfer conveyer.

11 Claims, 2 Drawing Sheets

WORKING SYSTEM FOR CIRCUIT BOARDS

INCORPORATION BY REFERENCE

This application is based on and claims priority under 35 U.S.C. 119 with respect to Japanese Application No. 2005-139053 filed on Apr. 11, 2005, the entire content of which is incorporated herein by reference.

BACKGROUND OF THE INVENTION

1. Field of the Invention

The present invention relates to a working system for circuit boards such as a mounting apparatus for mounting electronic components on a circuit board, a printing machine for printing solder on a circuit board, an adhesive applying machine for applying adhesive on a circuit board, and the like.

2. Discussion of the Related Art

Heretofore, a working system for circuit boards uses circuit board transfer means for transferring circuit boards into and from the system, and as the transfer means, there has been known one which positions each circuit board upon engagement with a stop. A technology has been in existence for reducing the circuit board transfer speed from a high speed to a low speed to absorb the shock upon engagement with the stop, and another technology has also been in existence for detecting whether or not the circuit board is present at a predetermined position when stopped.

For example, Japanese Unexamined Published Patent Application No. 11-163595 (the equivalent thereto: U.S. Pat. No. 6,189,674 B1) discloses a stop for positioning a circuit board to a target position, a positioning detector for detecting the engagement of the circuit board with the stop and an arrival detector for detecting the arrival of the circuit board at a predetermined position which is between a transfer start position from which the circuit board begins to start and a target position at which the transfer is to be terminated and further discloses the provision of a function of outputting a deceleration signal to a drive device in response to a detection signal from the arrival detector. That is, there are disclosed a technology for judging the presence of the circuit board at the predetermined position in dependence on the positioning detector and another technology for decelerating the board transfer speed from the high speed to the low speed to absorb the shock upon engagement with the stop in dependence on the arrival detector and in accordance with the deceleration signal output function.

However, the prior art requires dedicated sensors which respectively serve as the positioning detector and the arrival detector and thus, gives rise to a problem that the provision of such dedicated sensors causes the working system for circuit boards to be increased in manufacturing cost. Further, since it is often the case that a back surface is used to support the circuit board at a working position in the working system, the existence of the arrival detector in the case makes it difficult to provide a support mechanism for the circuit board around the arrival detector.

SUMMARY OF THE INVENTION

It is therefore a primary object of the present invention to provide an improved working system for circuit boards which does not require dedicated sensors such as a positioning detector and an arrival detector thereby to be reduced in manufacturing cost.

Another object of the present invention is to provide an improved working system for circuit boards which is less in restrictions on supporting the back surface of a circuit board.

According to one aspect of the present invention, there is provided a working system for circuit boards which comprises reference mark position detection means for detecting the position of a reference mark provided on a circuit board; working means for performing predetermined works on the circuit board on the basis of the position of the reference mark detected by the reference mark position detection means; and circuit board transfer means for transferring the circuit board to a working position where the predetermined works are to be performed by the working means. The working system further comprises a peculiar portion provided at a position lower than the circuit board on the circuit board transfer means to be detectable by, or hidable from, the reference mark position detection means during the transfer operation of the circuit board; and judgment means for detecting the absence of the circuit board at a predetermined position on the circuit board transfer means in response to a signal from the reference mark position detection means.

With this construction, the reference mark position detection means for detecting the position of the reference mark on the circuit board is also utilized for detecting the peculiar portion hidable therefrom to control the operation of the circuit board transfer means. Therefore, in dependence on the result of the detection, the presence/absence of the circuit board at the predetermined position on the transfer device can be detected without providing any sensor dedicated for that purpose, so that the working system can be reduced in manufacturing cost.

According to another aspect of the present invention, there is provided a working system for circuit boards, which comprises reference mark position detection means for detecting the position of a reference mark provided on a circuit board; working means for performing predetermined works on the circuit board on the basis of the position of the reference mark detected by the reference mark position detection means; and circuit board transfer means for transferring the circuit board to a working position where the predetermined works are to be performed by the working means. The working system further comprises a peculiar portion provided at a position lower than the circuit board on the circuit board transfer means to be detectable by, or hidable from, the reference mark position detection means during the transfer operation of the circuit board; and deceleration control means for controlling the circuit board transfer means to decelerate the transfer speed of the circuit board when the peculiar portion begins to be hidden by the circuit board from the reference mark position detection means.

With the construction in this aspect, the reference mark position detection means for detecting the position of the reference mark on the circuit board is also utilized for detecting the peculiar portion hidable therefrom to control the operation of the circuit board transfer means. Therefore, in dependence on the result of the detection, it becomes possible to output at an appropriate timing a deceleration signal for decelerating the transfer speed of the circuit board transfer means from a high speed to a lower speed, without providing any sensor dedicated for that purpose, so that the working system can be reduced in manufacturing cost.

BRIEF DESCRIPTION OF THE DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DESCRIPTION OF A PREFERRED EMBODIMENT OF THE INVENTION

Hereinafter, one embodiment of the present invention will be described with reference to the accompanying drawings. First of all, with reference to FIG. 1, description will be made regarding the exterior and general construction of an electronic component mounting apparatus which is exemplified as a working system for circuit boards according to the present invention.

Figure 1:
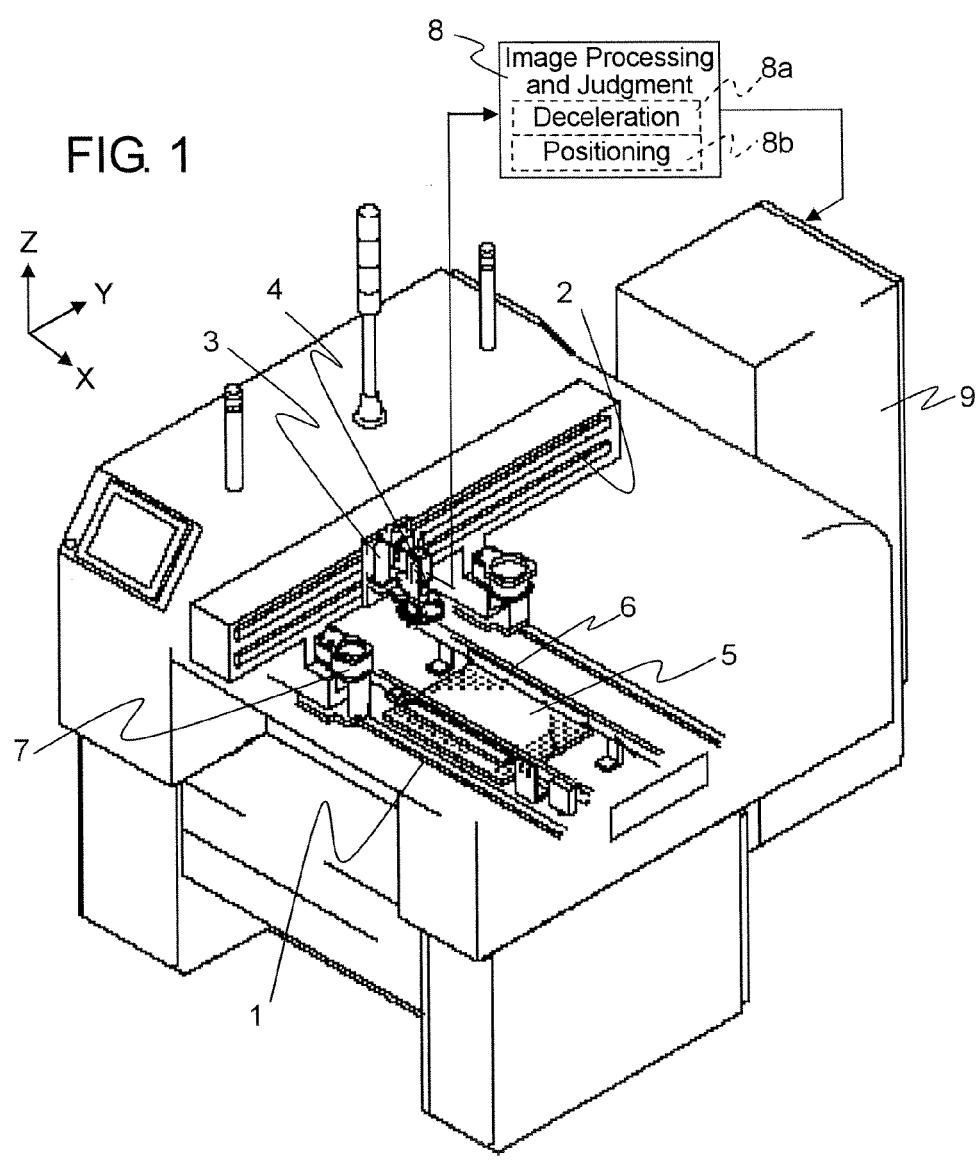
FIG. 1 is a perspective view of an electronic component mounting apparatus as one example of a working system for circuit boards to which the present invention is applied.

Referring now to FIG. 1, the exterior of the electronic component mounting apparatus is shown, which comprises an X-drive axis 1, a Y-drive axis 2, a mounting head 3, an image pickup camera 4, a circuit board transfer conveyer 6, a circuit board backup plate 5, and a lighting unit 7. The X-drive axis 1, the Y-drive axis 2, the mounting head 3 and the lighting unit 7 constitute working means, the image pickup camera 4 constitutes reference mark position detection means, and the circuit board transfer conveyer 6 constitutes circuit board transfer means.

The image pickup camera 4 is mounted on the mounting head 3, and the mounting head 3 and the image pickup camera 4 are movable together by the X-drive axis 1 and the Y-drive axis 2 in an X-Y plane. Further, the mounting head 3 incorporates therein an electronic component suction nozzle or tool (not shown), which is movable relative to the mounting head 3 in a Z-axis direction perpendicular to the X-Y plane and which is rotatable relative to the mounting head 3 about a Q-axis (not shown) extending in parallel to the Z-axis direction.

Next, the electronic component mounting operation of the apparatus as constructed above will be described briefly. A circuit board 22 (shown in FIG. 2) loaded by the circuit board transfer conveyer 6 into the apparatus is positioned to a predetermined working position indicated by the two-dot-chain line in FIG. 2. The circuit board backup plate 5 mounts thereon a plurality of support members or pins (not shown) for supporting the circuit board 22 from the side of a reverse or back surface of the same, and when clamping the circuit board 22, the support pins support the circuit board 22 at the back surface of the same. The mounting head 3 is moved by the X-drive axis 1 and the Y-drive axis 2 over an electronic component supply device (not shown), and the electronic component suction tool picks up and holds an electronic component. The mounting head 3 is moved to make the image pickup camera 4 detect the position of a reference mark 22a (refer to FIG. 2) provided on the circuit board 22. In the course of being moved over an electronic component mounting point on the circuit board 22, the picked-up electronic component is moved to across the space over the lighting unit 7, and the image pickup camera 4 executes an image processing for a deviation in relative position between the axis of the electronic component suction tool and the center of the electronic component held on the suction tool.

More specifically, when the mounting head 3 reaches a predetermined position over the lighting unit 7 in the course of being moved across the space over the lighting unit 7, a lighting command is generated from a control device 9 of the apparatus based on position signals detected by encoders (not shown) incorporated in the X-drive axis 1 and the Y-drive axis 2, and the lighting unit 7 is operated to flash. This results in transmitting the image of the suction tool holding the electronic component thereon through a prism (not shown) to the image pickup camera 4. Thus, the image of the suction tool holding the electronic component thereon is taken by the image pickup camera 4. Data of the image is processed by an image processing and judgment unit 8 in accordance with a well-known manner, whereby there can be obtained a deviation of the center of the electronic component from the axis of the electronic component suction tool holding the component.

When the mounting head 3 is moved to a reference mark image pickup position over the circuit board 22 which is positioned at the predetermined working position on the transfer conveyer 6, the image pickup camera 4 locates the position of the reference mark 22a on the circuit board 22. Thus, a further movement of the mounting head 3, that is, the axis of the suction nozzle toward a programmed target position on the circuit board 22 is controlled on the basis of the located position of the reference mark 22a and in dependence on the detected deviation of the center of the electronic component from the axis of the electronic component suction tool. Therefore, the electronic component can be mounted the programmed target position on the circuit board 22. After all of electronic components are mounted on the circuit board 22 in this manner, the circuit board 22 is unclamped, the circuit board transfer conveyer 6 operates to unload the circuit board 22 into another working system (not shown) next thereto.

Figure 4:
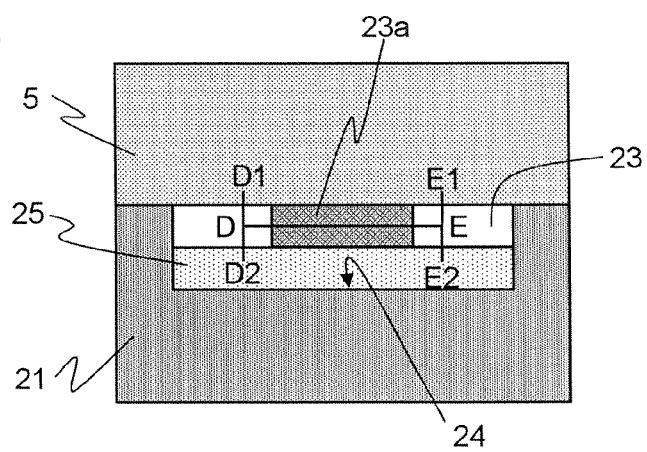
FIG. 4 is an explanatory view showing the image of a peculiar portion taken by an image pickup camera.

Next, the details of the embodiment will be described with reference to FIGS. 2 through 4. FIG. 3 is a fragmentary view of the circuit board transfer conveyer 6 as viewed in the direction of the arrow B in FIG. 2. FIG. 4 shows an image taken by the image pickup camera 4 of the neighborhood of one of cutouts 24 which are formed in one of holding rails 21 of the circuit board transfer conveyer 6 to make a line in the lengthwise direction thereof.

Figure 2:
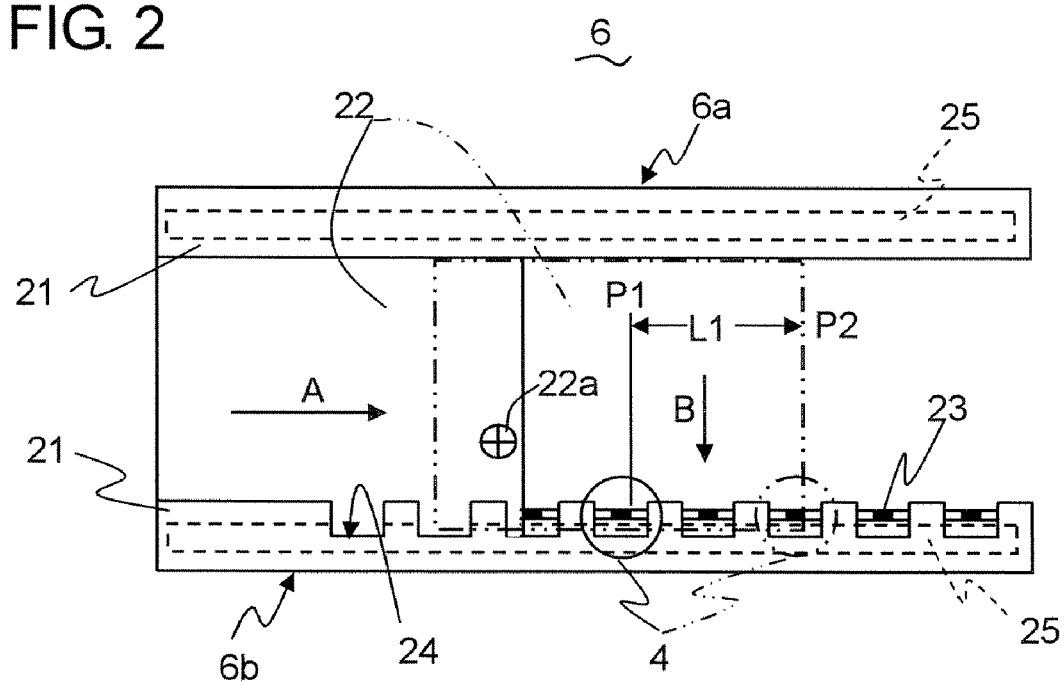
FIG. 2 is a plan view of a circuit board transfer conveyer incorporated in the electronic component mounting apparatus shown in FIG. 1.
Figure 3:
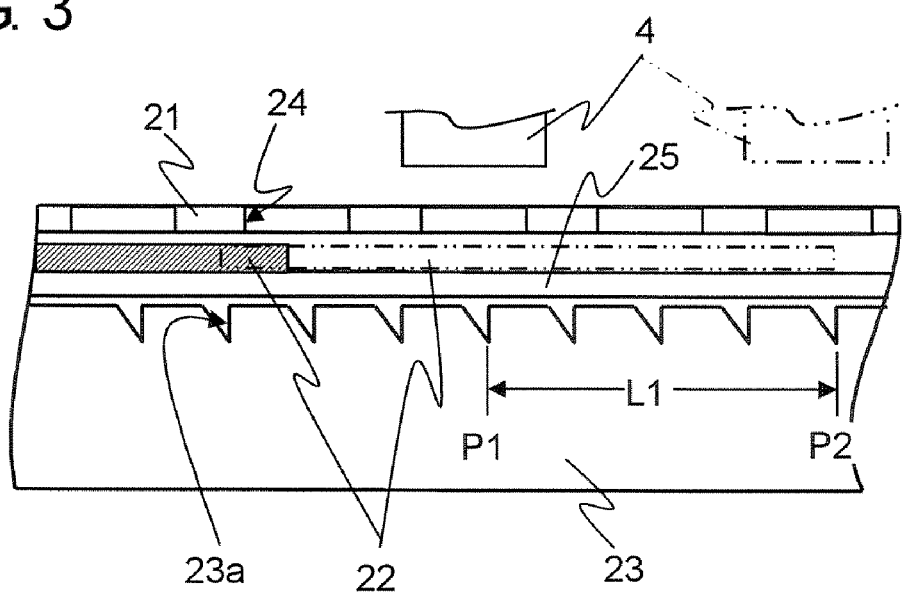
FIG. 3 is an enlarged fragmentary view of the circuit board transfer conveyer as viewed in the direction of the arrow B in FIG. 2.

As shown in FIG. 2, the circuit board transfer conveyer 6 is composed of a pair of transfer guide mechanisms 6a and 6b which cooperate to support, transfer, clamp/unclamp (move up and down) the circuit board 20. As typically shown in FIG. 3 in detail, each of the transfer guide mechanisms 6a and 6b comprises an circulation transfer belt 25, a board lifting plate 23 and the holding rail 21. The board lifting plate 23 is provided at a corresponding one lateral end portion of the circuit board backup plate 5 to be upright from the same.

The circuit board 22 is carried on the circulation transfer belts 25 and is transferred in a direction of the arrow A in FIG. 2. In advance of the transfer operation by the transfer belts 25, the image pickup camera 4 is positioned by the X and Y-drive axes 1, 2 to a first unique or peculiar portion detection position P1 shown in FIGS. 2 and 3 and remains thereat. During the transfer operation, the image processing and judgment unit 8 continuously executes an image processing and command routine for the image of a unique or peculiar portion formed on one of the board lifting plates 23, as referred to later in detail. The image processing and command routine executed by the image processing and judgment unit 8 includes a deceleration control routine 8a. While the recognition of the peculiar portion is made exactly, the deceleration control routine 8a instructs the control device 9, which thus controls the circuit board transfer conveyer 6 to keep the board transfer speed at a high speed. However, when the peculiar portion comes not to be recognized by being hidden from the image pickup camera 4 remaining at the first peculiar portion detection position P1, that is, when the arrival of the circuit board 22 to the first peculiar portion detection position P1 is detected, the deceleration control routine 8a instructs the control device 9, which then controls the circuit board transfer conveyer 6 to decelerate the board transfer speed from the high speed to a low speed.

Upon completion of this deceleration control, the image pickup camera 4 together with the mounting head 3 is immediately moved by the operation of the X-drive axis 1 to a second unique or peculiar portion detection position P2 shown in FIGS. 2 and 3 at a higher speed than the decelerated transfer speed of the circuit board 22 and waits at the second peculiar portion detection position P2 for the arrival of the circuit board 22 to the working position where the mounting head 3 operates to mount electronic components on the circuit board 22. The second peculiar portion detection position P2 is spaced from the first peculiar portion detection position P1 by a distance L1, as shown in FIGS. 2 and 3.

Further, a positioning control routine 8b (refer to FIG. 1) which is also included in the image processing and judgment unit 8 executes a judgment of whether or not the circuit board 22 has been positioned to the working position on the circuit board transfer conveyer 6. When the peculiar portion formed on the board lifting plate 23 is not recognized by the image pickup camera 4, it is judged that the circuit board 22 is present at the working position. On the other hand, when the peculiar portion is recognized by the image pickup camera 4, the circuit board 22 is judged not to be present at the predetermined working position. Accordingly, in the present embodiment, the presence of the circuit board 22 at the predetermined working position on the circuit board transfer conveyer 6 can be detected by utilizing the image pickup camera 4 without providing any dedicated sensor for that purpose.

As described above, this particular embodiment exemplifies the deceleration control and the positioning control of the circuit board 22 on the circuit board transfer conveyer 6 which are performed by shifting the image pickup camera 4 from the first peculiar portion detection position P1 to the second peculiar portion detection position P2. In a modified form, the shifting of the image pickup camera 4 is not required. This can be done by keeping the image pickup camera 4 at a predetermined position such as, e.g., the first peculiar portion detection position P1, wherein the deceleration control routine 8a instructs the control device 9 to decelerate the transfer speed of the circuit board transfer conveyer 6 when the peculiar portion is hidden by the leading edge of the circuit board 22 from the image pickup camera 4, while the positioning control routine 8b instructs the control device 9 to discontinue the operation of the circuit board transfer conveyer 6 when the peculiar portion appears to detected by the image pickup camera 4 after the passing of the trailing edge of the circuit board 22.

Next, the manner in which the image pickup camera 4 at each of the first and second peculiar portion detection positions P1 and P2 detects the peculiar portion will be described with reference to FIGS. 2 to 4. As shown in FIG. 3, the peculiar portion in the present embodiment is made in the form of a plurality of triangular cutout or grooves 23a which are formed on the upper surface of the board lifting plate 23 made of stainless steel having the thickness of 0.8 mm. Thus, when the image pickup camera 4 takes the image of one groove 23a, the image is taken like one shown in FIG. 4 because each groove 23a reflects less light than the upper surface of the stainless steel board lifting plate 23 does. When detection is made for the degree of brightness between two points D and E on the upper surface of the lifting plate 23, the brightness therebetween is judged by the execution of a well-known binarization processing to change "light", "dark" and "light" in turn. Further, the brightness at each of the distances between points D1 and D2 and between points E1 and E2 is judged to change "dark", "light" and "dark" in turn. At the same time, light pixels and dark pixels are counted. As a consequence, the image processing and judgment unit 8 can judged whether or not, the peculiar portion is recognized correctly and can also judge the lengths of the respective distances. By these judgments, the peculiar portion can be prevented from being wrongly recognized as any circuit pattern or the like on the circuit board 22, so that it can be realized to provide an electronic component mounting apparatus which is reliable in judging the presence of a circuit board at the predetermined working position on the circuit board transfer conveyer 6.

Preferably, the relative position of the image pickup camera 4 to the lifting plate 23 is selected so that the peculiar portion of the lifting plate 23 resides within the depth of field of the image pickup camera 4. By so doing, an object for image pickup can be taken clearly, so that it can be realized to obtain an image processing result which is higher in reliability.

As described above, the peculiar portion which can be detected by the image pickup camera 4 serving also as the reference mark position detection means is provided at the position lower than the circuit board 22 being transferred to be hidable from the image pickup camera 4. Thus, in dependence on the result of the detection, the presence of the circuit board 22 at the predetermined position on the transfer conveyer 6 can be detected without providing any sensor dedicated for that purpose. It can be realized to provide the working system for circuit boards which is able to decelerate the circuit board transfer speed in dependence also on the result of the detection and which can thus be reduced in manufacturing cost. Further, by the omission of dedicated sensors for the presence at the predetermined position, it can be realized to decrease restrictions on supporting the circuit board 22 from the back or reverse surface side.

Although in the aforementioned embodiment, the image processing and judgment unit 8 is described as a component independent of the control device 9, it may be constituted as a function which is executed by a microcomputer (not shown) incorporated in the control device 9.

Obviously, numerous further modifications and variations of the present invention are possible in light of the above teachings. It is therefore to be understood that within the scope of the appended claims, the present invention may be practiced otherwise than as specifically described herein.

What is claimed is:

1. A working system for circuit boards comprising:
reference mark position detection means for detecting the position of a reference mark provided on a circuit board;
working means for performing predetermined works on the circuit board on the basis of the position of the reference mark detected by the reference mark position detection means;
circuit board transfer means for transferring the circuit board to a working position where the predetermined works are to be performed by the working means;
a peculiar portion provided at a position lower than the circuit board on the circuit board transfer means such that the peculiar portion is detectable by the reference mark position detection means when the circuit board is not between the peculiar portion and the reference mark position detection means, and the peculiar portion is not detectable by the reference mark position detection means when the circuit board arrives at a predetermined position on the circuit board transfer means during the transfer operation of the circuit board; and
judgment means responsive to a signal from the reference mark position detection means for detecting whether the circuit board is absent or present at the predetermined position on the circuit board transfer means.

2. The working system as set forth in claim 1, wherein the working means includes a working head movable within a plane parallel to a surface of the circuit board on which the working head performs the predetermined works and wherein the reference mark position detection means is movable together with the working head within the plane.

3. The working system as set forth in claim 2, wherein the predetermined position is the working position, the working system further comprising:
deceleration control means for controlling the circuit board transfer means to decelerate the transfer speed of the circuit board when the peculiar portion begins to be hidden from the reference mark position detection means during the transfer operation of the circuit board.

4. The working system as set forth in claim 2, wherein the predetermined position is the working position, and the peculiar portion is provided to be hidden by the circuit board from the reference mark position detection means when the circuit board is transferred by the circuit board transfer means to the working position.

5. The working system as set forth in claim 2, wherein:
the reference mark position detection means comprises an image pickup camera; and
the peculiar portion is provided within the depth of field of the image pickup camera.

6. A working system for circuit boards comprising:
reference mark position detection means for detecting the position of a reference mark provided on a circuit board;
working means for performing predetermined works on the circuit board on the basis of the position of the reference mark detected by the reference mark position detection means;
a circuit board transfer device configured to transfer the circuit board to a working position where the predetermined works are to be performed by the working means, the circuit board transfer device including,
a pair of circulation transfer belts provided to be horizontally spaced in a direction perpendicular to a transfer direction of the circuit board for conveying the circuit board while carrying lateral end portions of the circuit board respectively thereon,
a pair of holding rails respectively extending over and along the pair of circulation transfer belts for holding the upper surfaces on the lateral end portions of the circuit board when the same is moved upward to be clamped on the circuit board transfer device, one of the holding rails having a plurality of cutouts formed along the lengthwise direction thereof, and
a pair of board lifting plates respectively extending under the pair of holding rails and movable for bringing the lateral end portions of the circuit board into engagement with the pair of holding rails when the circuit board is to be clamped on the circuit board transfer device;
a peculiar portion provided at a position lower than the circuit board on the circuit board transfer device to be detectable by, or hidable from, the reference mark position detection means during the transfer operation of the circuit board; and
judgment means for detecting whether the circuit board is absent or present at a predetermined position on the circuit board transfer device in response to a signal from the reference mark position detection means;
wherein the peculiar portion comprises an arrangement which is provided on one of the board lifting plates under the holding rail having the plurality of cutouts, to be detected by the reference mark position detection means through the cutouts.

7. The working system as set forth in claim 6, wherein:
one board lifting plate with the arrangement thereon is made of stainless steel; and
the arrangement comprises a plurality of grooves which are formed on the upper surface of the stainless steel board lifting plate so that the grooves can be distinguished from the remaining upper surface of the stainless steel board lifting plate as differences in brightness when detected by the reference mark position detection means.

8. A working system for circuit boards comprising:
reference mark position detection means for detecting the position of a reference mark provided on a circuit board;
working means for performing predetermined works on the circuit board on the basis of the position of the reference mark detected by the reference mark position detection means;
circuit board transfer means for transferring the circuit board to a working position where the predetermined works are to be performed by the working means;
a peculiar portion provided at a position lower than the circuit board on the circuit board transfer means such that the peculiar portion is detectable by the reference mark position detection means when the circuit board is not between the peculiar portion and the reference mark position detection means, and the peculiar portion is not detectable by the reference mark position detection means when the circuit board arrives at a predetermined position on the circuit board transfer means during the transfer operation of the circuit board;
judgment means responsive to a signal from the reference mark position detection means for detecting whether the circuit board is absent or present at the predetermined position on the circuit board transfer means; and
deceleration control means responsive to a signal from the judgment means for controlling the circuit board transfer means to decelerate the transfer speed of the circuit board when the judgment means detects that the peculiar portion begins to be hidden by the circuit board from the reference mark position detection means.

9. The working system as set forth in claim 8, wherein:
the reference mark position detection means comprises an image pickup camera; and the peculiar portion is provided within the depth of field of the image pickup camera.

10. A working system for circuit comprising:
a circuit board transfer device configured to transfer a circuit board to a working position thereon where predetermined works are to be performed;
an image pickup camera configured to detect the position of a reference mark provided on a surface of the circuit board;
a working head movable within a plane parallel to the surface of the circuit board on the circuit board transfer device, and configured to perform the predetermined works on the circuit board on the basis of the position of the reference mark detected by the image pickup camera, the image pickup camera being carried on the working head for movement together with the same within the plane;
a peculiar portion provided at a position lower than the circuit board on the circuit board transfer device such that the peculiar portion is detectable by the image pickup camera when the circuit board is not between the peculiar portion and the imagepickup camera, and the peculiar portion is not detectable by the image pickup camera when the circuit board arrives at a predetermined position on the circuit board transfer device during the transfer operation of the circuit board; and
judgment means responsive to a signal from the image pickup camera configured to detect whether the circuit board is absent or present at a predetermined position on the circuit board transfer device
wherein:
the circuit board transfer device includes a pair of transfer guide mechanisms provided with a pair of rails for guiding lateral end portions of the circuit board during the transfer operation of the same; and
at least one cutout is formed on one of the rails, and is configured to enable the image pickup camera to detect the peculiar portion therethrough when the circuit board is not across a visual field of the image pickup camera directed toward the peculiar portion through the at least one cutout.

11. The working system set forth in claim 10, wherein:
the predetermined position is the working position;
the circuit board transfer device further includes a pair of board lifting plates configured to clamp the lateral end portions of the circuit board on the rails after the circuit board is positioned to the working position; and
the peculiar position is a groove formed on an upper surface of one of the board lifting plates which is made of stainless steel.

\* \* \* \* \*